United States Patent
Aizawa et al.

(10) Patent No.: US 10,112,553 B2
(45) Date of Patent: Oct. 30, 2018

(54) GARNISH FOR VEHICLE

(71) Applicant: Honda Access Corp., Niiza-shi, Saitama (JP)

(72) Inventors: Fumihiko Aizawa, Niiza (JP); Hiroyuki Hatori, Niiza (JP)

(73) Assignee: HONDA ACCESS CORP., Niiza-shi (JP)

( * ) Notice: Subject to any disclaimer, the term of this patent is extended or adjusted under 35 U.S.C. 154(b) by 5 days.

(21) Appl. No.: 15/102,229

(22) PCT Filed: May 14, 2014

(86) PCT No.: PCT/JP2014/062852
§ 371 (c)(1),
(2) Date: Jun. 6, 2016

(87) PCT Pub. No.: WO2015/087563
PCT Pub. Date: Jun. 18, 2015

(65) Prior Publication Data
US 2016/0304034 A1    Oct. 20, 2016

(30) Foreign Application Priority Data

Dec. 12, 2013    (JP) .................................. 2013-257454

(51) Int. Cl.
*B60R 13/02*    (2006.01)
*B60R 7/04*    (2006.01)
(Continued)

(52) U.S. Cl.
CPC ................ *B60R 13/02* (2013.01); *B60R 7/04* (2013.01); *B60R 7/08* (2013.01); *B60R 7/10* (2013.01);
(Continued)

(58) Field of Classification Search
CPC ... B60R 7/04; B60R 13/0237; B60R 13/0206; B60R 13/02
(Continued)

(56) References Cited

U.S. PATENT DOCUMENTS 6,719,321 B2 * 4/2004 Yasuhara ................ B60R 21/04
                                                                280/730.2
9,505,356 B2 * 11/2016 Migaki ............... B60R 13/0237

FOREIGN PATENT DOCUMENTS

JP    57-203124 U    12/1982
JP    60-182223 U    12/1985
(Continued)

OTHER PUBLICATIONS

Office Action dated Apr. 27, 2017, issued in counterpart Chinese Application No. 201480066548.4, with English translation (8 pages).
(Continued)

*Primary Examiner* — Pinel E Romain
(74) *Attorney, Agent, or Firm* — Westerman, Hattori, Daniels & Adrian, LLP

(57) ABSTRACT

A garnish for a vehicle includes a vehicle exterior garnish section facing the outside of a vehicle body and a vehicle interior garnish section facing the inside of a passenger compartment, wherein the vehicle interior garnish section has a panel opposing surface (14) opposite to an opening edge of a vehicle external side of an opening section (6) of a vehicle body panel (5) and an interior surface (13) facing the inside of the passenger compartment through the opening section (6), and the vehicle exterior garnish section is installed at the vehicle external side of the vehicle interior garnish section.

7 Claims, 10 Drawing Sheets

(51) Int. Cl.
*B60R 7/08* (2006.01)
*B60R 13/04* (2006.01)
*B60R 7/10* (2006.01)

(52) U.S. Cl.
CPC ...... *B60R 13/0206* (2013.01); *B60R 13/0237* (2013.01); *B60R 13/04* (2013.01); *B60R 2013/0287* (2013.01); *B60R 2013/0293* (2013.01)

(58) Field of Classification Search
USPC ....................................................... 296/1.08
See application file for complete search history.

(56) References Cited

FOREIGN PATENT DOCUMENTS

| | | |
|---|---|---|
| JP | 2-133940 U | 11/1990 |
| JP | 11-321468 A | 11/1999 |
| JP | 2002-205588 A | 7/2002 |
| JP | 2007-223405 A | 9/2007 |
| JP | 2011-131770 A | 7/2011 |
| JP | 5105814 B2 | 12/2012 |

OTHER PUBLICATIONS

Notice of Allowance dated Jun. 6, 2017, issued in counterpart Japanese Patent Application No. 2013-257454, with English translation. (6 pages).
Office Action dated Jan. 4, 2017, issued in counterpart Japanese Application No. 2013-257454, with English ranslation. (6 pages).
International Search Report dated Jun. 10, 2014, issued in counterpart International Application No. PCT/JP2014/062852, w/English translation (2 pages).

\* cited by examiner

GARNISH FOR VEHICLE

TECHNICAL FIELD

The present invention relates to a garnish for a vehicle attached to a vehicle body panel of a vehicle.

Priority is claimed on Japanese Patent Application No. 2013-257454, filed Dec. 12, 2013, the content of which is incorporated herein by reference.

BACKGROUND ART

As a garnish for a vehicle attached to a vehicle body panel, a structure in which a vehicle exterior garnish section facing the outside of a vehicle body and a vehicle interior garnish section facing the inside of a passenger compartment are integrated is known (for example, see Patent Document 1).

The garnish for a vehicle disclosed in Patent Document 1 is a door protective garnish attached to a lower edge of a door panel. The garnish for a vehicle disclosed in Patent Document 1 has a vehicle exterior garnish section attached to a vehicle exterior side surface of the lower edge of the door panel and a vehicle interior garnish section attached to a vehicle interior side surface of the lower edge of the door panel, which are integrally connected to each other via a thin hinge section.

PRIOR ART DOCUMENTS

Patent Document

Patent Document 1: Japanese Patent No. 5105814

SUMMARY OF INVENTION

Problems to be Solved by the Invention

The garnish for a vehicle disclosed in Patent Document 1 is a member attached to a lower edge portion of a door panel. However, for example, like when a garnish is attached to an opening section of a vehicle body panel to which a rear quarter glass is attached instead of the rear quarter glass of as standard vehicle, the garnish may be attached to the opening section of the vehicle body panel to close the opening section.

In this case, like the garnish for a vehicle disclosed in Patent Document 1, when the vehicle exterior garnish section is attached to the vehicle exterior side surface of the vehicle body panel and the vehicle interior garnish section is attached to the passenger compartment interior side surface of the vehicle body panel, an occupancy space in a passenger compartment inward direction of the vehicle interior garnish section is increased, and an effective space in the passenger compartment may be oppressed.

In consideration of the above-mentioned circumstances, an aspect of the present invention is directed to provide a garnish for a vehicle capable of being attached to a peripheral edge of an opening section of a vehicle body panel to close the opening section while suppressing a space occupancy quantity in a passenger compartment inward direction of a vehicle interior garnish section.

Means for Solving the Problems

In a garnish for a vehicle according to the present invention, the following configurations were employed to solve the above-mentioned problems.

(1) A garnish for a vehicle according to an aspect of the present invention is a garnish for a vehicle attached to a peripheral edge of an opening section formed in as vehicle body panel to close the opening section, the garnish for a vehicle including: a vehicle exterior garnish section facing an outside of a vehicle body; and a vehicle interior garnish section facing an inside of a passenger compartment, wherein the vehicle interior garnish section has a panel opposing surface opposite to an opening edge of a vehicle external side of the opening section of the vehicle body panel, and an interior surface facing the inside of the passenger compartment through the opening section, and the vehicle exterior garnish section is installed at a vehicle external side of the vehicle interior garnish section.

In the case of the aspect of the present invention, the panel opposing surface of the vehicle interior garnish section is formed to oppose the opening edge of the vehicle external side of the opening section of the vehicle body panel. For this reason, an outer peripheral side portion of the interior surface of the vehicle interior garnish section is not disposed at a region inside the passenger compartment of the opening section of the vehicle body panel. For this reason, the opening section of the vehicle body panel can be closed by the garnish for a vehicle while suppressing an increase in occupancy space in a passenger compartment inward direction of the vehicle interior garnish section.

(2) In the aspect of (1), an article locking section that is able to lock an article at the inside of the passenger compartment may be formed at the interior surface of the vehicle interior garnish section.

According to the above-mentioned configuration, in the passenger compartment, a bag-shaped article storage member or another article can be locked to the article locking section formed at the interior surface.

(3) In the aspect of (1) or (2), the vehicle exterior garnish section and the vehicle interior garnish section may be integrally formed with each other.

In this case, since the number of components of the garnish for a vehicle can be reduced to decrease manufacturing cost and there is no need to attach a plurality of parts to the vehicle body panel, an assembly work with respect to the vehicle body panel is also eased.

(4) In any one aspect of (1) to (3), a stepped section that is able to protrude to the inside of the passenger compartment with respect to the panel opposing surface to be fitted into the opening section may be formed between the panel opposing surface and the interior surface.

In this case, as the stepped section of the vehicle interior garnish section is fitted into the opening section of the vehicle body panel from the vehicle external side, the garnish for a vehicle can be stably attached to the vehicle body panel.

Advantageous Effects of Invention

According to the aspects of the present invention, since the vehicle interior garnish section has the panel opposing surface opposite to the opening edge of the vehicle external side of the opening section of the vehicle body panel and the interior surface facing the inside of the passenger compartment through the opening section, and the vehicle exterior garnish section is formed at the vehicle external side of the vehicle interior garnish section, the garnish for a vehicle can be attached to the opening section of the vehicle body panel to close the opening section while suppressing an increase in space occupancy quantity in the passenger compartment inward direction of the vehicle interior garnish section.

DESCRIPTION OF EMBODIMENTS

Figure 1:
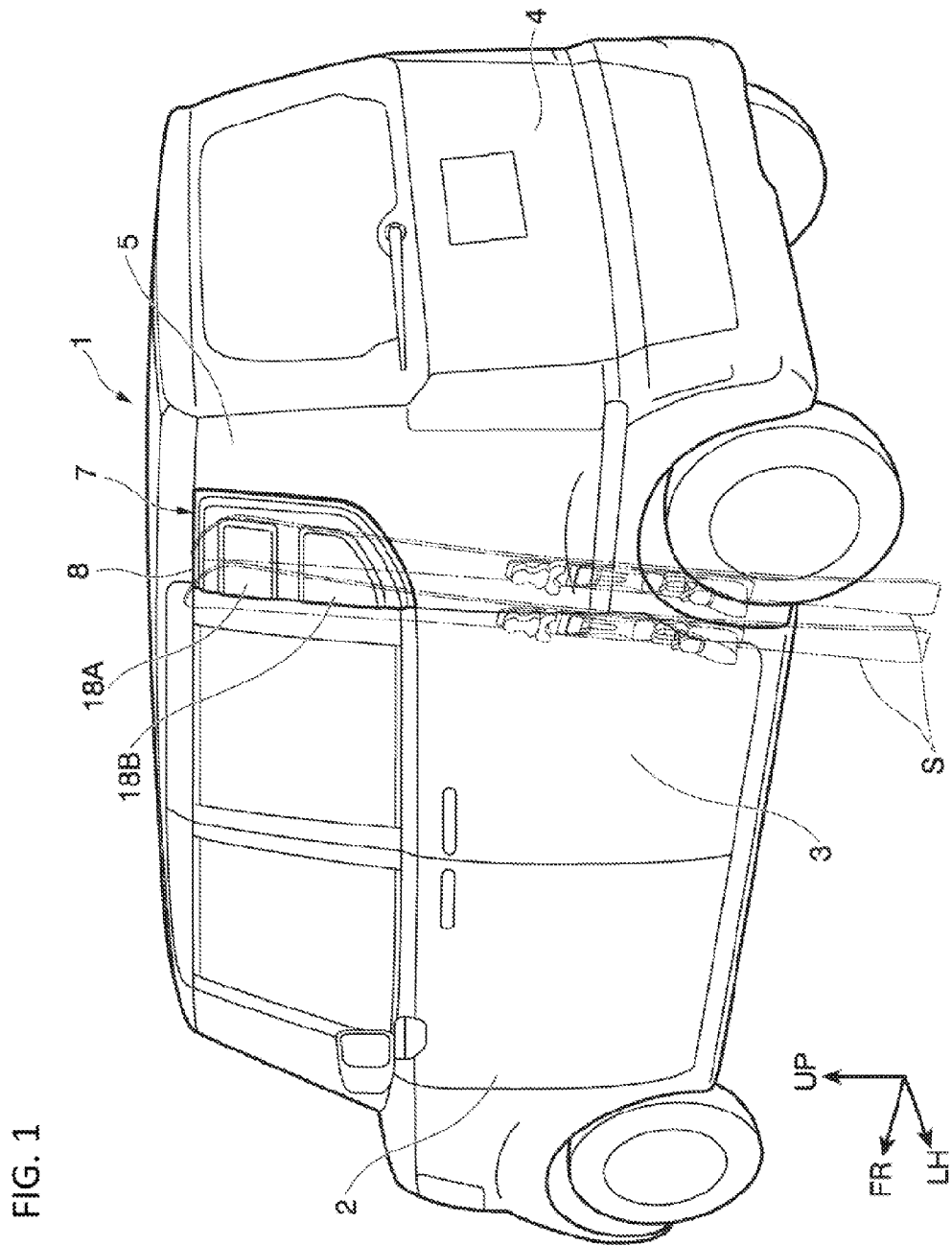
FIG. 1 is a perspective view of a vehicle external side of a vehicle of a first embodiment of the present invention.

Hereinafter, an embodiment of the present invention is described with reference to the accompanying drawings. Further, in the drawings, an arrow FR represents a front side of a vehicle, an arrow UP represents an upper side of the vehicle, and an arrow LH represents a left side of the vehicle.

First, a first embodiment shown in FIGS. 1 to 9 will be described.

Figure 2:
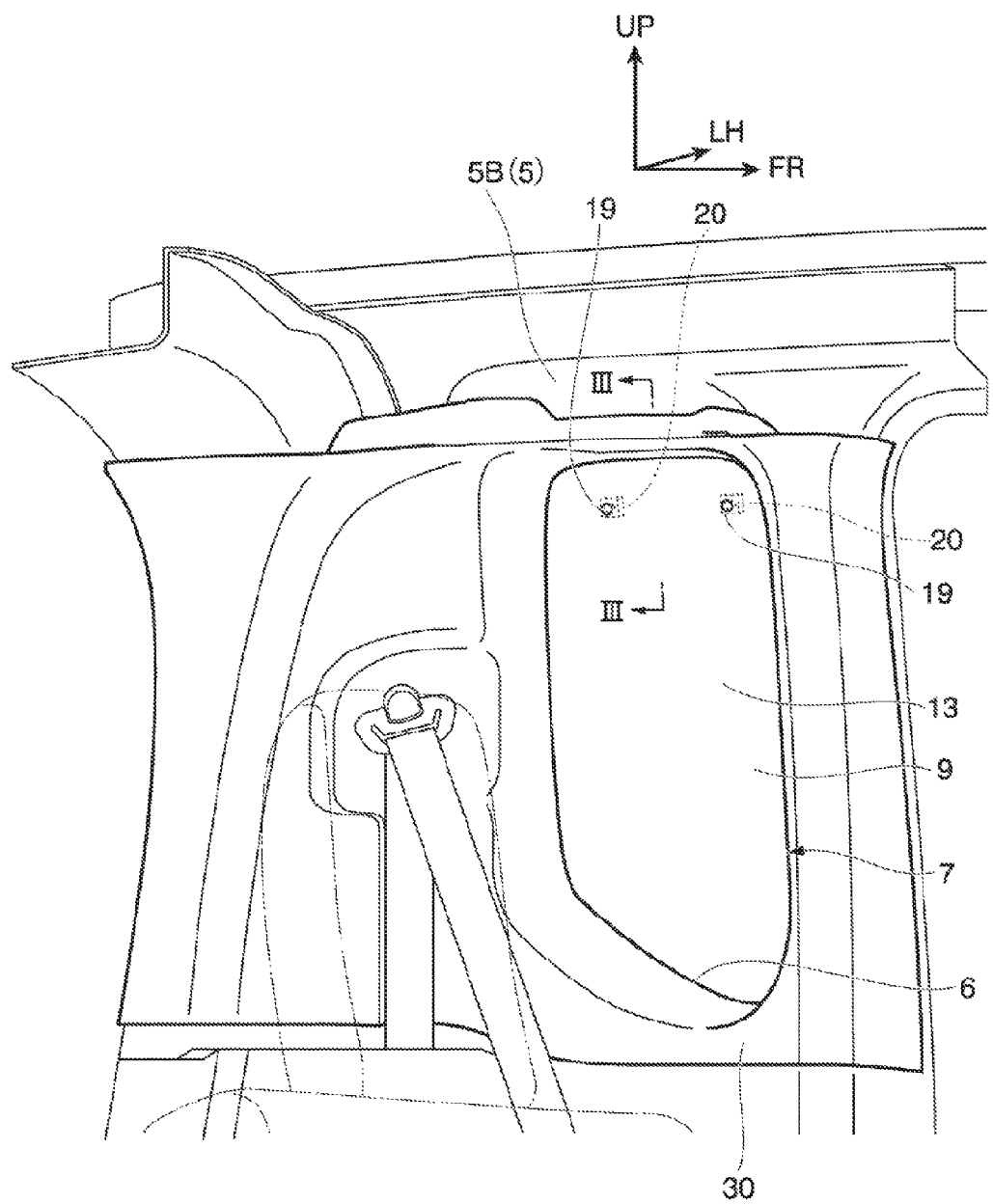
FIG. 2 is a perspective view in a passenger compartment of the vehicle of the first embodiment of the present invention.

FIG. 1 is a perspective view showing a vehicle 1 of the embodiment when seen from an upper side of a left rear section, and FIG. 2 is a perspective view showing the inside of the left rear section of the vehicle 1 from the inside of a passenger compartment.

The vehicle 1 of the embodiment has a front door 2 and a rear door 3 installed at a side portion of a vehicle body, and a tail gate 4 installed at a rear portion of the vehicle body that can be freely opened and closed. An elongated opening section 6 having a substantially rectangular shape is formed at a position of a vehicle body panel 5 of the side portion close to a rear side of the rear door 3, and the opening section 6 is closed by a garnish 7 for a vehicle. In the vehicle 1 of the embodiment, the garnish 7 for a vehicle is attached to a peripheral edge of the opening section 6 to which a rear quarter glass of a standard vehicle is attached instead of the rear quarter glass. The opening section 6 has a shape in which, strictly, a lower side of a rectangular shape is inclined forward and downward, and the entirety thereof is slightly rounded. Further, reference numeral 30 of FIG. 2 designates an interior trim attached to the inside of the passenger compartment of the vehicle body panel 5.

Figure 3:
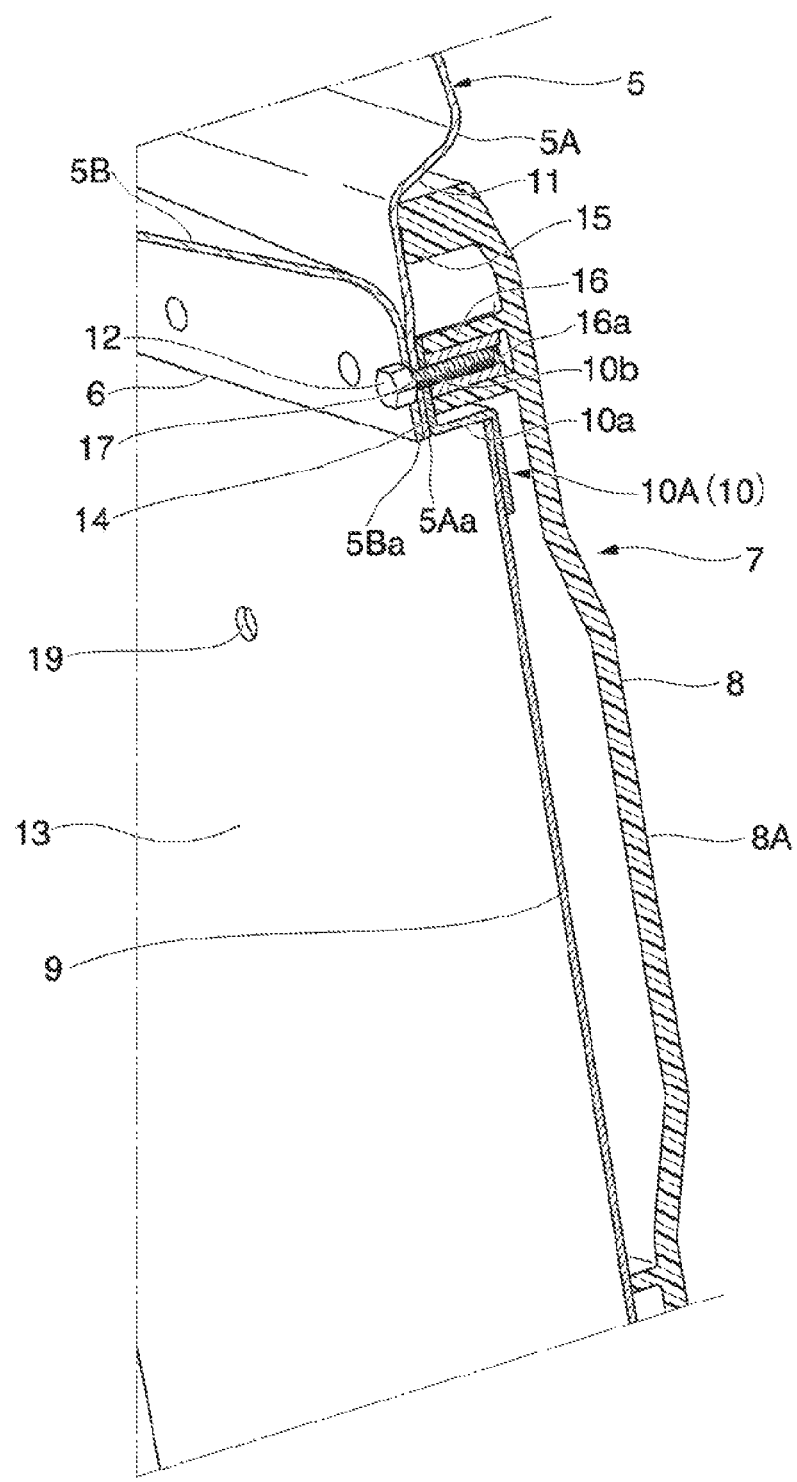
FIG. 3 is a perspective view showing a cross section taken along line III-III of FIG. 2 of the vehicle of the first embodiment of the present invention.
Figure 4:
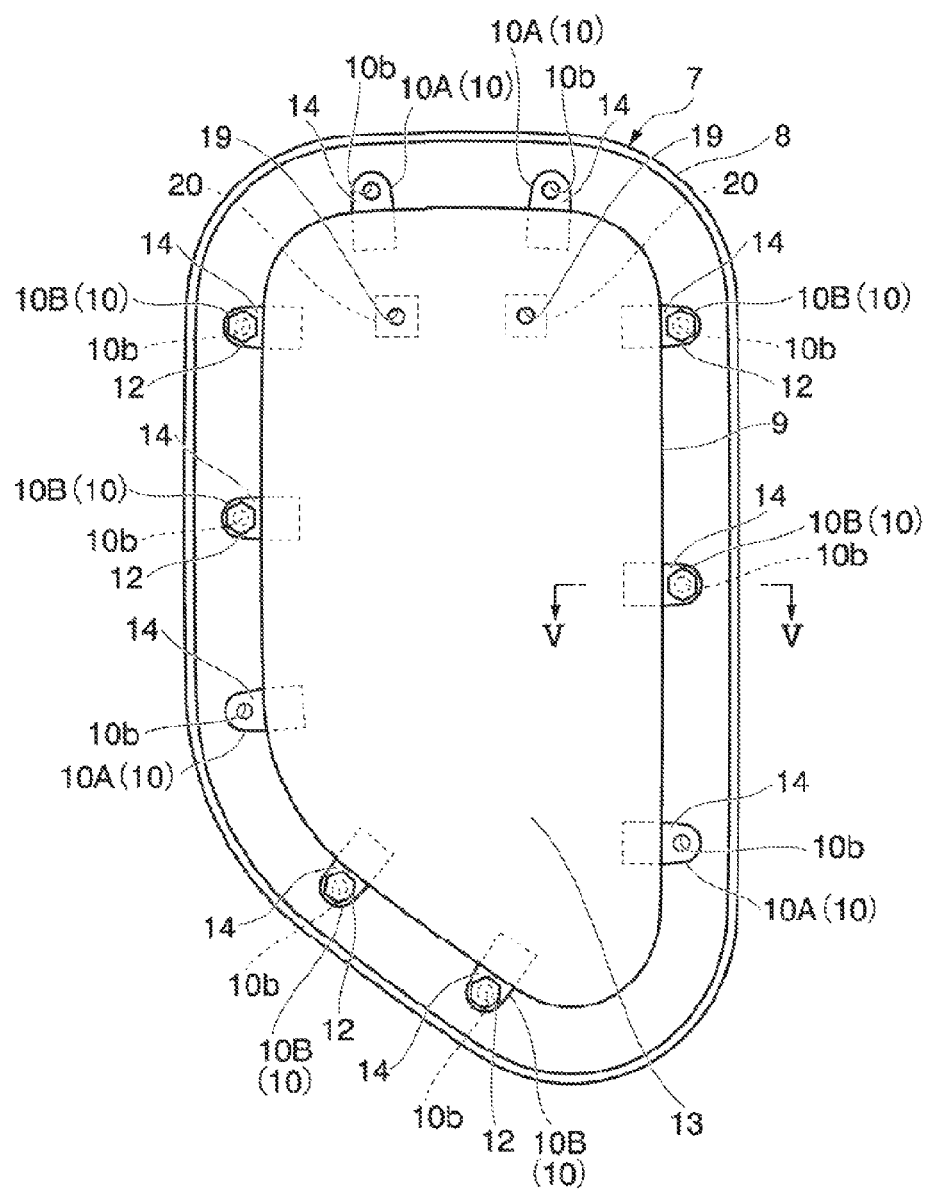
FIG. 4 is a rear view of a garnish for a vehicle of the first embodiment of the present invention.
Figure 5:
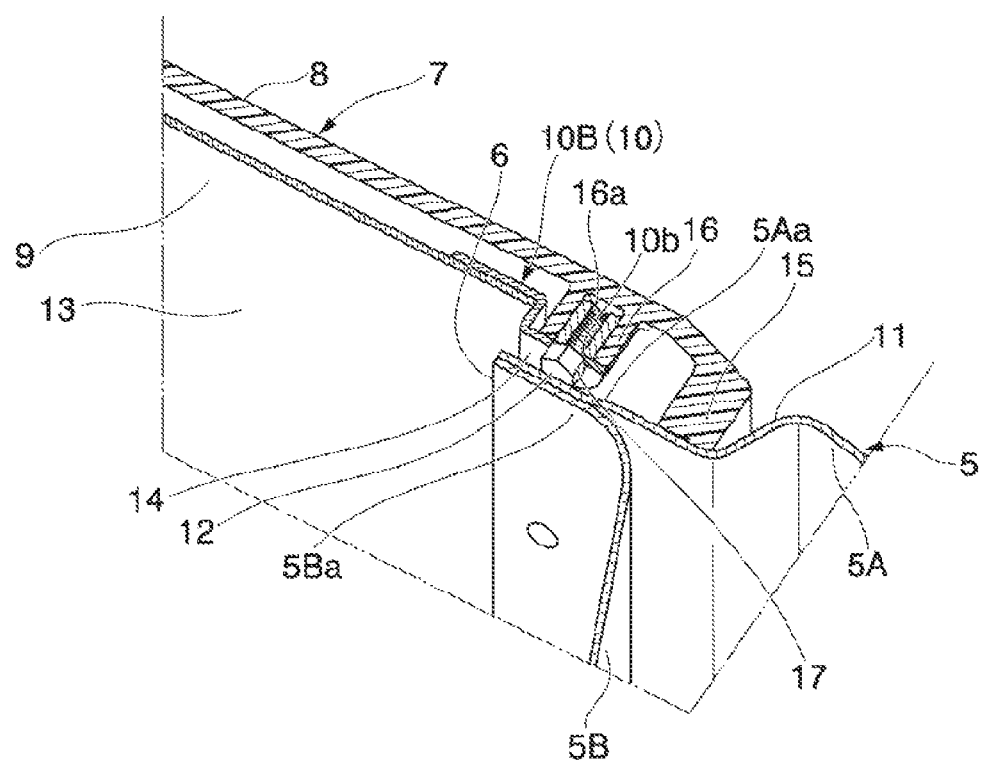
FIG. 5 is a perspective view showing a cross section of a portion corresponding to a cross section taken along line V-V of FIG. 4 of the garnish for a vehicle of the first embodiment of the present invention.
Figure 6:
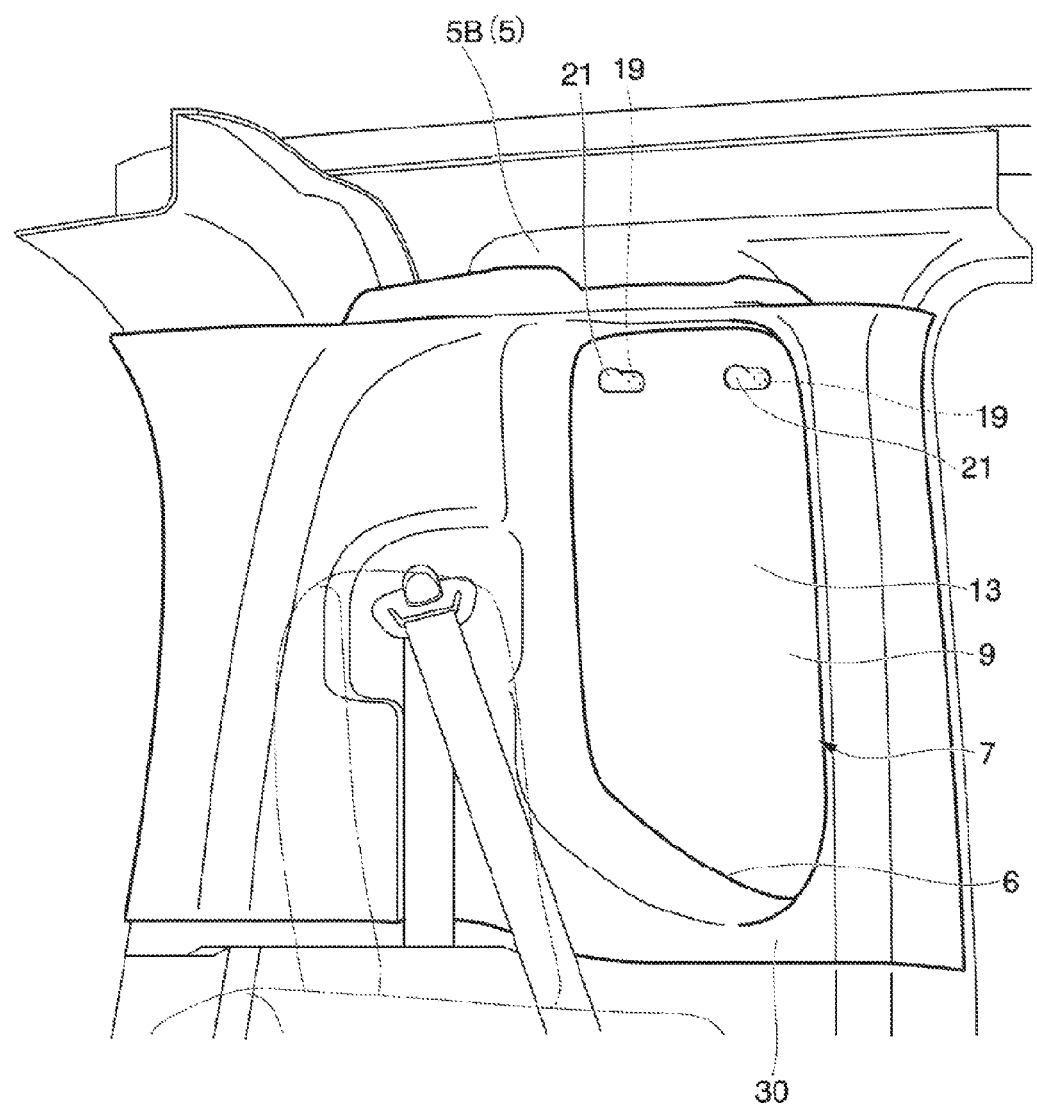
FIG. 6 is a perspective view of the inside of the passenger compartment of the vehicle of the first embodiment of the present invention.

FIG. 3 is a perspective view showing a cross-section taken along line III-III of FIG. 2. FIG. 4 is a view showing the garnish 7 for a vehicle when seen from a rear surface side (a side disposed in the passenger compartment). FIG. 5 is a perspective view showing a cross section corresponding to a cross section taken along line V-V of FIG. 4. Further, in FIG. 3, the interior trim 30 is omitted for the convenience of illustration.

The garnish 7 for a vehicle includes an outer garnish 8 facing the outside of the vehicle body, an inner garnish 9 having a portion facing the inside of the passenger compartment, and a plurality of brackets 10 fixed to an outer peripheral edge portion of the inner garnish 9 and fixed to the outer garnish 8 by fastening. In the embodiment, the outer garnish 8 constitutes a vehicle exterior garnish section, and the inner garnish 9 and the plurality of brackets 10 constitute a vehicle interior garnish section.

As shown in FIG. 3, in the vehicle body panel 5 that constitutes the opening section 6, an outer panel 5A disposed at a vehicle external side and an inner panel 5B disposed inside the vehicle body are bonded to each other to form a closed cross section therebetween. Flange sections 5Aa and 5Ba are formed at a peripheral edge of the opening section 6 of the outer panel 5A and the inner panel 5B, and the flange sections 5Aa and 5Ba are fixed to each other by welding. The flange section 5Aa of the outer panel 5A is formed to be recessed in a concave shape at a peripheral region of the opening section 6 with respect to a general surface of the vehicle external side of the outer panel 5A. Hereinafter, a region recessed in the concave shape is referred to as a "concave section 11 of the outer panel 5A."

As shown in FIG. 4, the inner garnish 9 of the garnish 7 for a vehicle is constituted by a metal plate having a flat plate shape substantially conforming to a shape of the opening section 6 of the vehicle body panel 5. As shown in FIG. 3, the brackets 10 are formed of a rectangular metal plate bent in a crank shape, and one end sides thereof that enclose a bent portion 10a is fixed to a vehicle external side surface of an outer peripheral edge portion of the inner garnish 9 by welding. The other end sides that enclose the bent portion 10a of the bracket 10 extend outward in an outer circumferential direction at a position closer to a vehicle internal side than the inner garnish 9. A bolt insertion hole 10b into which a fastening bolt 12 is inserted is formed at an extension section of the other end of the bracket 10.

Two of the brackets 10 are attached to each of an upper side portion and a lower side portion of the inner garnish 9, and three of the brackets 10 are attached to each of a front side portion and a rear side portion of the inner garnish 9. Among the brackets 10, the two brackets installed at the upper side portion of the inner garnish 9 and the two brackets installed at lowermost end portions of the front side portion and the rear side portion of the inner garnish 9 are fixed to the outer garnish 8 and the vehicle body pane 5 by the bolts 12 through jointing as will be described in detail. Then, the remaining six brackets 10 are fixed to only the outer garnish 8 by the bolts 12 through fastening.

Hereinafter, when the brackets 10 are classified, a bracket fixed to the outer garnish 8 and the vehicle body panel 5 by jointing is referred to as "a fixing bracket 10A" and a bracket fixed to only the outer garnish 8 by fastening is referred to as "an assembly bracket 10B."

In the embodiment, substantially the entire region of a surface of the inner garnish 9 directed in the passenger compartment inward direction constitutes an interior surface 13 facing the inside of the passenger compartment through the opening section 6 of the vehicle body panel 5, and in the extension sections of the other end sides of the plurality of brackets 10, a surface opposite to an opening edge of the vehicle external side of the opening section 6 of the vehicle body panel 5 constitutes a panel opposing surface 14.

On the other hand, the outer garnish 8, which is formed of a resin material, of the garnish 7 for a vehicle is slightly larger than an external shape in which the inner garnish 9 and the bracket 10 are formed together, and is formed in an external shape substantially similar to the inner garnish 9. A peripheral edge rib 15 protrudes from the outer peripheral edge portion of the outer garnish 8 in the passenger compartment inward direction, and a portion of the peripheral edge rib 15 is disposed in the concave section 11 of the outer panel 5A. Then, boss sections 16 having screw holes 16a protrude from as portion of a rear surface of the outer garnish 8 opposite to the extension sections of the brackets 10 attached to the inner garnish 9. Further, protrusion heights of all of the boss sections 16 are not uniform, and the protrusion heights of the boss sections 16 corresponding to the assembly brackets 10B are set to be smaller than the protrusion heights of the boss sections 16 corresponding to the fixing brackets 10A.

The inner garnish 9 and the outer garnish 8 match the extension sections of the plurality of brackets 10 of the inner garnish 9 with end surfaces of the boss sections 16 corresponding to the outer garnish 8, and in this state are fastened to the boss sections 16 corresponding to the assembly brackets 10B by the bolts 12, and thus are both integrally assembled to each other.

A plurality of (four) bolt insertion holes 17 corresponding to the bolt insertion holes 10b of the fixing brackets 10A are formed in the flange sections 5Aa and 5Ba of the vehicle body panel 5. The garnish 7 for a vehicle of the embodiment is attached to the vehicle body by inserting shaft sections of the bolts 12 into the bolt insertion holes 17 and 10b of the flange sections 5Aa and 5Ba and the fixing bracket 10A, and in this state tip portions of the bolts 12 are fastened into the corresponding boss sections 16.

Convex portions 18A and 18B swelling at the vehicle external side with respect to the outer peripheral edge portion of the outer garnish 8 and the general surface of the vehicle external side of the vehicle body panel 5 are integrally formed with an outer surface of the outer garnish 8. For example, when an article S having a large length such as skis or the like stands against the vehicle external side, the convex portions 18A and 18B can be used to abut against a side surface of an upper end of the article S. In the embodiment, the convex portions 18A and 18B are provided to be spaced apart from each other at upper and lower sides.

In addition, as shown in FIG. 2, screw insertion holes 19 are formed at two places in the interior surface 13 of the inner garnish 9 that are spaced apart from each other in a forward/rearward direction of the vehicle body of a region close to the upper section. Weld nuts 20 are installed at positions in the vehicle external side of the screw insertion holes 19 of the inner garnish 9. Screw shafts (not shown) of locking hooks 21 shown in FIG. 6 serving as article locking sections are inserted into the screw insertion holes 19. The locking hooks 21 are attached to the inner garnish 9 by fastening tip portions of the screw shafts to the weld nuts 20. In this way, the locking hooks 21 attached to the inner garnish 9 protrude from the interior surface 13 to the inside of the passenger compartment through the opening section 6 of the vehicle body panel 5. An article such as a bag-shaped storage member, a small object or the like, can be directly suspended and supported from the inside of the passenger compartment by the locking hooks 21.

Figure 7:
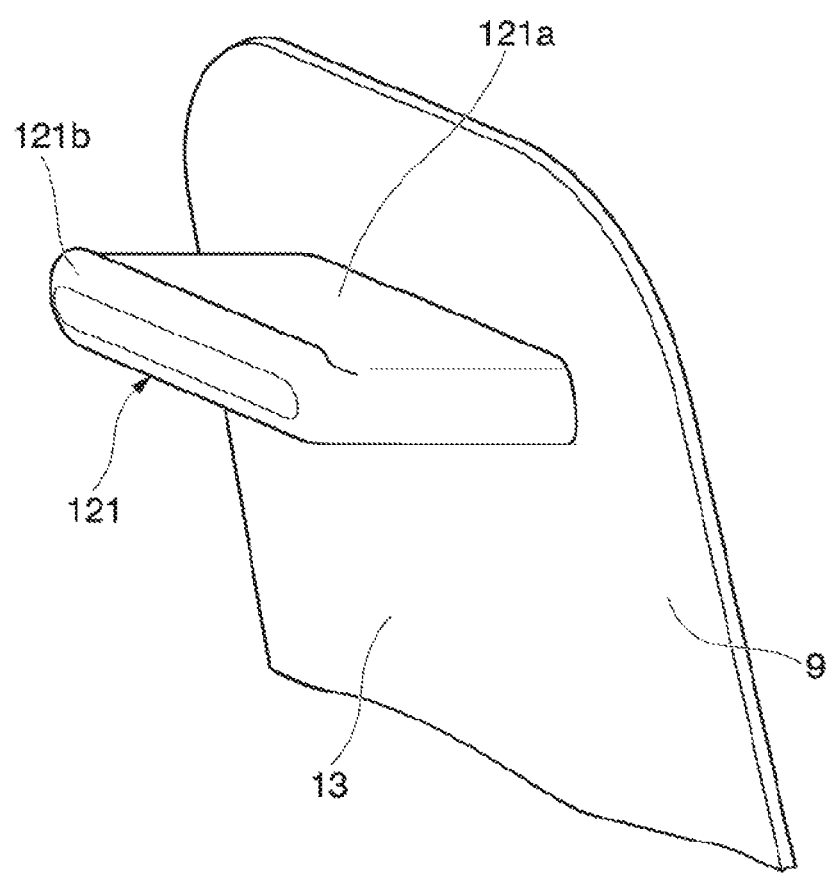
FIG. 7 is a perspective view of a vehicle interior garnish section of a variant of the first embodiment of the present invention.
Figure 8:
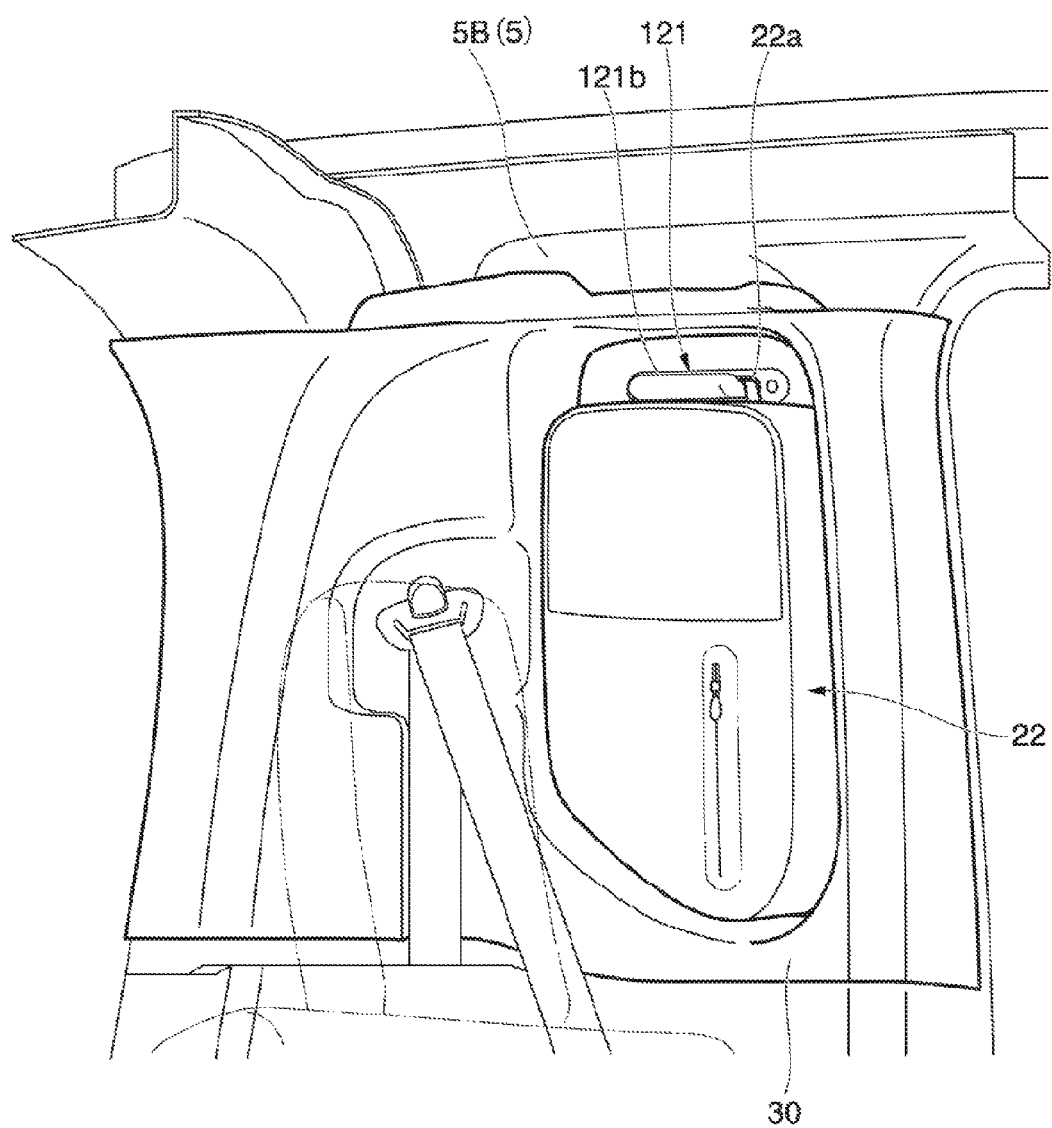
FIG. 8 is a perspective view of the vehicle interior garnish section of the variant of the first embodiment of the present invention.
Figure 9:
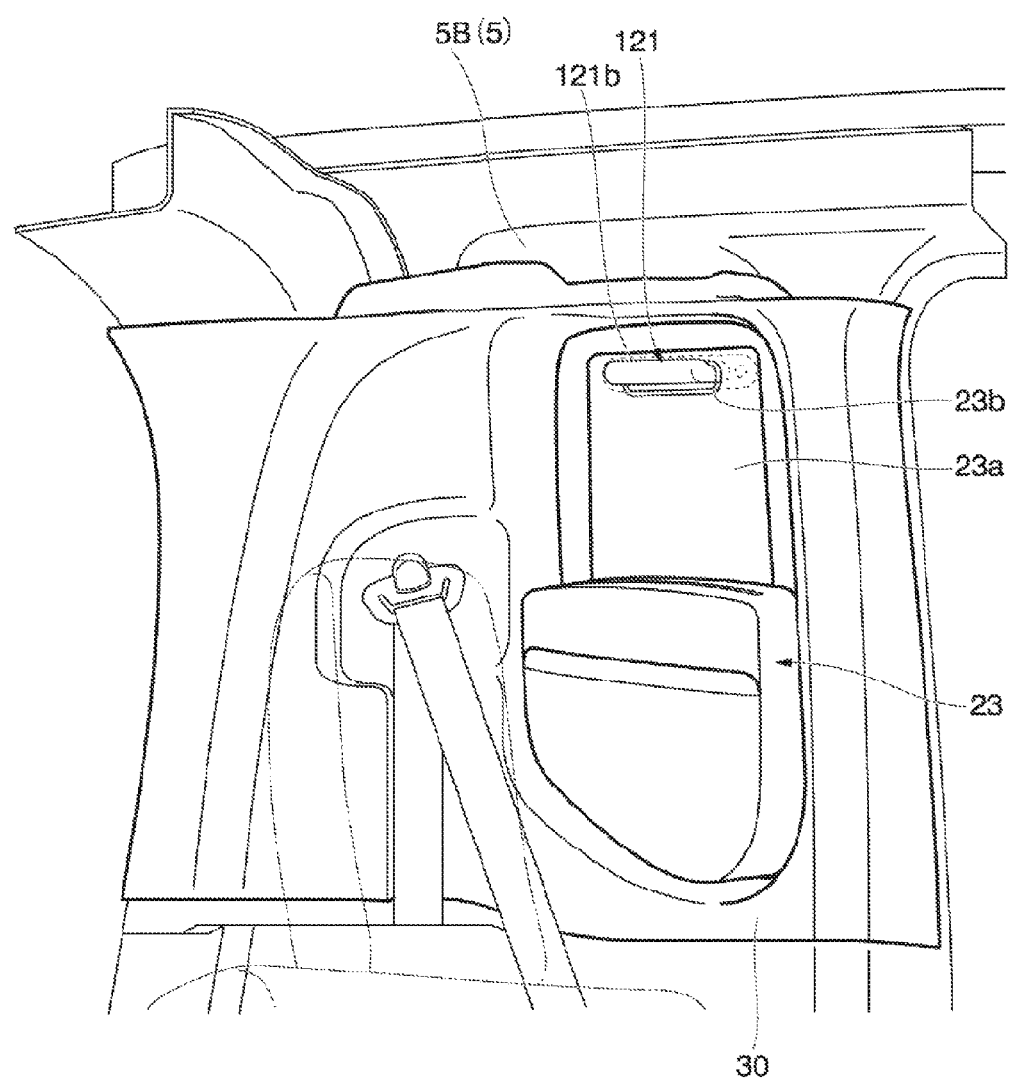
FIG. 9 is a perspective view of the vehicle interior garnish section of the variant of the first embodiment of the present invention.

FIGS. 7 to 9 are views showing a variant of the first embodiment. In the variant, shapes of locking hooks 121 attached to the interior surface 13 of the inner garnish 9 are different from each other. The locking hooks 121 of the variant are large arm-shaped members that are elongated in a forward/rearward direction of the vehicle body, and base end side portions thereof are attached throughout the screw insertion hole 19 (see FIG. 2) and the weld nut 20 (see FIG. 2) of the flout and rear sides.

As shown in FIG. 7, the locking hook 121 has a locking surface 121a formed at an upper surface side and substantially horizontally extending in the forward/rearward direction of the vehicle body, and a hook-shaped locking protrusion 121b rising upward from an end portion of the inside of the passenger compartment of the locking surface 121a.

In the locking hook 121 of the variant, for example, a rucksack-shaped article accommodating bag 22 as shown in FIG. 8 or an article accommodating bag 23 having a shoulder bag shape as shown in FIG. 9 can be stably suspended and supported. Incidentally, the article accommodating bag 22 shown in FIG. 8 is stably supported by the locking hook 121 as a string braid handle section 22a is formed at an upper end portion, the handle section 22a is hooked by the locking hook 121 and a lower surface thereof extends in the forward/rearward direction on the locking surface 121a. In addition, the article accommodating bag 23 shown in FIG. 9 is stably supported by the locking hooks 121 as an opening section 23b that substantially coincides with a cross-sectional shape of the locking hook 121 is formed at a cover cloth 23a that covers an accommodating opening of the article, the opening section 23b is hooked by the locking hook 121 in a state in which the cover cloth 23a is open, and an upper side portion of the opening section 23b extends in the forward/rearward direction on the locking surface 121a.

As described above, in the garnish 7 for a vehicle according to the embodiment, since the panel opposing surface 14 (the bracket 10) opposite to the opening edge of the vehicle external side of the opening section 6 of the vehicle body panel 5 is formed at the outer peripheral edge portion of the inner garnish 9, an outer peripheral side portion other than the interior surface 13 facing the inside of the passenger compartment through the opening section 6 is not disposed farther inside the passenger compartment than the opening section 6. For this reason, the opening section 6 of the vehicle body panel 5 can be closed by the garnish 7 for a vehicle while suppressing an increase in occupancy space in the passenger compartment inward direction of the attachment section of the inner garnish 9.

In addition, in the garnish 7 for a vehicle according to the embodiment, the locking hook 21 or 121 serving as the article locking section is formed to protrude at the interior surface 13 of the inner garnish 9 inside in the passenger compartment. For this reason, the bag-shaped article accommodating section or another article can be suspended and supported in a relatively wide space of the peripheral edge of the opening section 6 in the passenger compartment.

Further, in the garnish 7 for a vehicle according to the present invention, when the long article S such as skis or the like stands against the vehicle external side on the outer surface of the outer garnish 8 attached to the vehicle external side of the inner garnish 9, the convex portions 18A and 18B that can support the side surface of the tip side of the article S are provided. For this reason, a posture of the article S can be stably held while the article S does not conic in contact with the outer surface of the vehicle body panel 5.

In addition, the garnish 7 for a vehicle of the embodiment has a structure in which the assembly bracket 10B is attached to the inner garnish 9 separately from the fixing bracket 10A and the assembly bracket 10B can be pre-fastened to the boss section 16 of the outer garnish 8 by a bolt. For this reason, conveyance or assembly to the vehicle body can be easily performed in a state in which the inner garnish 9 and the outer garnish 8 are pre-assembled.

Figure 10:
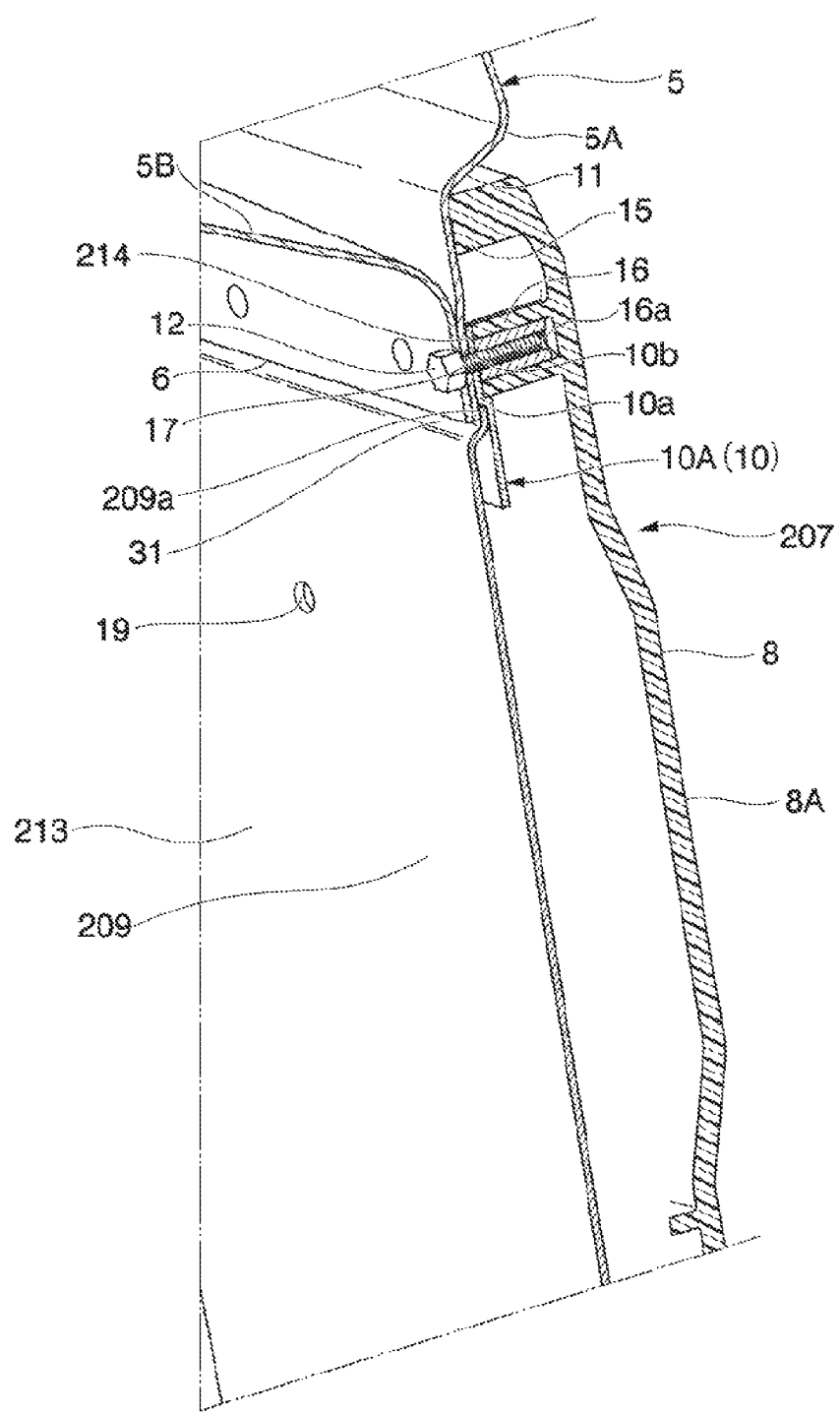
FIG. 10 is a cross-sectional view corresponding to a cross section taken along line III-III of FIG. 2 of a vehicle of a second embodiment of the present invention.

Next, a second embodiment shown in FIG. 10 will be described. Further, in the second embodiment, the same parts as in the above-mentioned first embodiment are designated by the same reference numerals, and overlapping description thereof will be omitted.

While a basic configuration of a garnish 207 for a vehicle of the embodiment is substantially the same as in the first embodiment, a size and an external shape of an inner garnish 209 formed of a metal plate differ from those of the first embodiment.

That is, the inner garnish 209 of the embodiment is slightly larger than the opening section 6 of the vehicle body panel 5 and has substantially the same shape as the opening section 6, and a peripheral edge region 209a disposed closer to the outer peripheral side than the opening section 6 constitutes a panel opposing surface 214 together with the extension section of the bracket 10. Then, a region farther inside than the panel opposing surface 214 (the peripheral edge region 209a) of the inner garnish 209 constitutes an interior surface 213 facing the inside of the passenger compartment via the opening section 6. In addition, a stepped section 31 that can protrude toward the inside of the passenger compartment with respect to the panel opposing surface 214 to be fitted into the opening section 6 is formed between the peripheral edge region 209a of the inner garnish 209 and the interior surface 213 that constitute a portion of the panel opposing surface 214. That is the interior surface 213 of the inner garnish 209 protrudes in the passenger compartment with respect to the peripheral edge region 209a by a height of the stepped section 31.

The garnish 207 for a vehicle of the embodiment can obtain substantially the same effect as the first embodiment. Furthermore, since the stepped section 31 that can be fitted into the opening section 6 is formed between the peripheral edge region 209a of the inner garnish 209 and the interior surface 213, upon attachment of the garnish 207 for a vehicle to the vehicle body, as the stepped section 31 is fitted into the opening section 6 of the vehicle body panel 5 from the vehicle external side, the garnish 207 for a vehicle can be stably attached to the vehicle body panel 5.

Further, in the first embodiment, while the locking hooks 21 and 121 serving as the article locking section are fixed to the inner garnish 9 by a screw clamp, an article holding member (for example, a storage shelf or the like) or an article itself in which a magnet is built may be magnetized and locked to a magnetized surface using the interior surface 13 of the inner garnish 9 itself formed of a metal as the magnetized surface. In this case, the magnetized surface constitutes the article locking section.

Further, when the inner garnish 9 is formed of a resin material or the like, a metal member (the magnetized surface) may be partially embedded in a portion of the inner garnish 9.

However, when the entire inner garnish 9 is formed of the metal plate like the above-mentioned embodiment and the entire region of the interior surface 13 is formed as the magnetized surface, manufacture thereof becomes easy to an extent in which machining for attaching the metal member to the inner garnish 9 is not needed.

Here, the case in which a portion or the entirety of the inner garnish 9 side is formed of the metal member and the magnet is built in the article holding member or the article has been described. However, on the contrary, the magnet may be built in the inner garnish 9 and the metal member may be installed at the article holding member or the article itself locked to the inner garnish 9. In this case, a surface of the inner garnish 9 side with the built-in magnet is the magnetized surface.

In the first and second embodiments, the vehicle exterior garnish section and vehicle interior garnish section are constituted by the outer garnish 8, the inner garnish 9 (209) and the bracket 10 that are separate parts. However, the vehicle exterior garnish section and the vehicle interior garnish section may be integrally formed of a resin material or the like.

In this case, since the number of the components of the garnish for a vehicle can be reduced to decrease manufacturing cost and there is no need to attach a plurality of parts to the vehicle body panel 5, an assembly work with respect to the vehicle body panel 5 is also eased.

Further, the present invention is not limited to the above-mentioned embodiments but various design changes may be made without departing from the scope of the present invention. For example, as described above, while the garnish for a vehicle attached to the opening section of the side surface of the rear section of the vehicle body has been described, the garnish for a vehicle is not limited to the opening section of the side portion of the rear section of the vehicle body, but may be attached to the opening section of the vehicle body panel of another area.

In addition, materials of the respective parts of the garnish for a vehicle are not limited to the above-mentioned materials but all of the parts may be formed of a metal. Further, in the above-mentioned embodiments, while a separate bracket is attached to the outer peripheral edge portion of the inner garnish, an attachment section with respect to the outer garnish or the vehicle body panel may be integrally formed with the inner garnish.

REFERENCE SIGNS LIST

5 Vehicle body panel
6 Opening section
7, 207 Garnish for a vehicle
8 Outer garnish (vehicle exterior garnish section)
9, 209 Inner garnish (vehicle interior garnish section)
10 Bracket (vehicle interior garnish section)
13, 213 Interior surface
14, 214 Panel opposing surface
21, 121 Locking hook (article locking section)
31 Stepped section

What is claimed is:

1. A garnish for a vehicle attached to a peripheral edge of an opening section formed in a vehicle body panel to close the opening section, the garnish for a vehicle comprising:
a vehicle exterior garnish section facing an outside of a vehicle body; and
a vehicle interior garnish section facing an inside of a passenger compartment,
wherein the vehicle interior garnish section has a panel opposing surface opposite to an opening edge of an vehicle external side of the opening section of the vehicle body panel, and an interior surface facing the inside of the passenger compartment through the opening section, the vehicle exterior garnish section is installed at a vehicle external side of the vehicle interior garnish section and is swelling toward the vehicle external side, a region farther inside than the panel opposing surface of the vehicle interior garnish section is swelling toward the vehicle external side, and an accommodating space is formed at a vehicle inner side of a portion of the vehicle interior garnish section swelling toward the vehicle external side.

2. The garnish for a vehicle according to claim 1, wherein an article locking section that is able to lock an article at the inside of the passenger compartment is formed at the interior surface of the vehicle interior garnish section.

3. The garnish for a vehicle according to claim 1, wherein a vehicle external side surface of the peripheral edge of the opening section is formed to be recessed in a concave shape and is provided at the peripheral edge of the opening section to close the opening section.

4. The garnish for a vehicle according to claim 2, wherein a vehicle external side surface of the peripheral edge of the opening section is formed to be recessed in a concave shape and is provided at the peripheral edge of the opening section to close the opening section.

5. The garnish for a vehicle according to claim 3, wherein at least a part of a peripheral edge of the vehicle exterior garnish section is formed by a plurality of brackets including a bent portion that is bent in the vehicle inner side from a fixing part fixed with a component consisting the interior surface and an extension section that extends outward in an outer circumferential direction from an end part of the bent portion in the vehicle inner side, a boss section for attachment is formed at a portion that opposes with the extension section of the bracket of the vehicle exterior garnish section, and at least one of the extension section of the bracket is fixed between the boss section and the peripheral edge of the opening section.

6. The garnish for a vehicle according to claim 5, wherein a rib that abuts to the peripheral edge of the opening section is formed at an outside of the boss section of the vehicle exterior garnish section.

7. The garnish for a vehicle according to claim 6, wherein a plurality of boss sections that have different lengths with each other are provided, and the boss sections include boss sections that are fixed to the peripheral edge of the opening section and the extension section of the bracket and boss sections that are only fixed to the extension section of the bracket.

* * * * *